United States Patent
Graiger et al.

(10) Patent No.: US 6,717,382 B2
(45) Date of Patent: Apr. 6, 2004

(54) METHOD OF CONNECTING A MOBILE CONTROL AND/OR MONITORING UNIT TO A MACHINE AND A CONTROL AND/OR MONITORING UNIT FOR SAME

(75) Inventors: Dieter Graiger, Steyregg (AT); Siegfried Richter, Lauf (DE)

(73) Assignee: Keba AG, Linz (AT)

( * ) Notice: Subject to any disclaimer, the term of this patent is extended or adjusted under 35 U.S.C. 154(b) by 0 days.

(21) Appl. No.: 09/810,153

(22) Filed: Mar. 16, 2001

(65) Prior Publication Data
US 2001/0035729 A1 Nov. 1, 2001

(30) Foreign Application Priority Data
Mar. 17, 2000 (AT) ............................................ 447/2000

(51) Int. Cl.⁷ ................................................. G05D 1/00
(52) U.S. Cl. ............. 318/587; 318/568.11; 318/568.12; 318/568.16; 318/568.23; 318/568.25
(58) Field of Search ............................ 318/587, 568.12, 318/568.16

(56) References Cited

U.S. PATENT DOCUMENTS

| 4,672,280 A | 6/1987 | Honjo ........................ 318/587 |
| 4,926,544 A | 5/1990 | Koyanagi et al. ............. 29/703 |
| 4,940,925 A | 7/1990 | Wand et al. ................. 318/587 |
| 5,488,277 A * | 1/1996 | Nishikawa et al. .......... 318/587 |
| 5,652,489 A * | 7/1997 | Kawakami ............. 318/568.12 |
| 6,044,675 A * | 4/2000 | Davi .............................. 72/7.1 |
| 6,157,864 A * | 12/2000 | Schwenke et al. ............. 700/79 |
| 6,167,464 A * | 12/2000 | Kretschmann ................ 710/15 |
| 6,173,215 B1 * | 1/2001 | Sarangapani ................ 700/250 |
| 6,315,062 B1 * | 11/2001 | Alft et al. ....................... 175/45 |
| 6,374,155 B1 * | 4/2002 | Wallach et al. ............. 700/245 |

* cited by examiner

*Primary Examiner*—Rita Leykin
(74) *Attorney, Agent, or Firm*—Collard & Roe, P.C.

(57) ABSTRACT

The invention relates to a method of connecting a mobile, electronic control and/or monitoring unit (9) to at least one machine or at least one machine component in a group or a plurality of machines (2) or machine components to be controlled and/or monitored. During a connection or log-on procedure between the control and/or monitoring unit (9) and a co-operating distant point on the respective machine (2), a clear link or log-on connection is set up either by means of interfaces (14, 15) to the selected, wireless direction-finder of the co-operating distant point or alternatively by means of transmitters and/or receivers (16, 17) tuned to a restricted, localized functional or operating range (21). Once the connection has been acknowledged and established, the programmed control and/or monitoring of the machine (2) or the machine component is managed via another, standard data transmission means (22), for example a hard-wired network and/or via a wireless link between the control and/or monitoring unit (9) and the selected machine (2). Also proposed is a control and/or monitoring unit (9) for implementing this method.

22 Claims, 3 Drawing Sheets

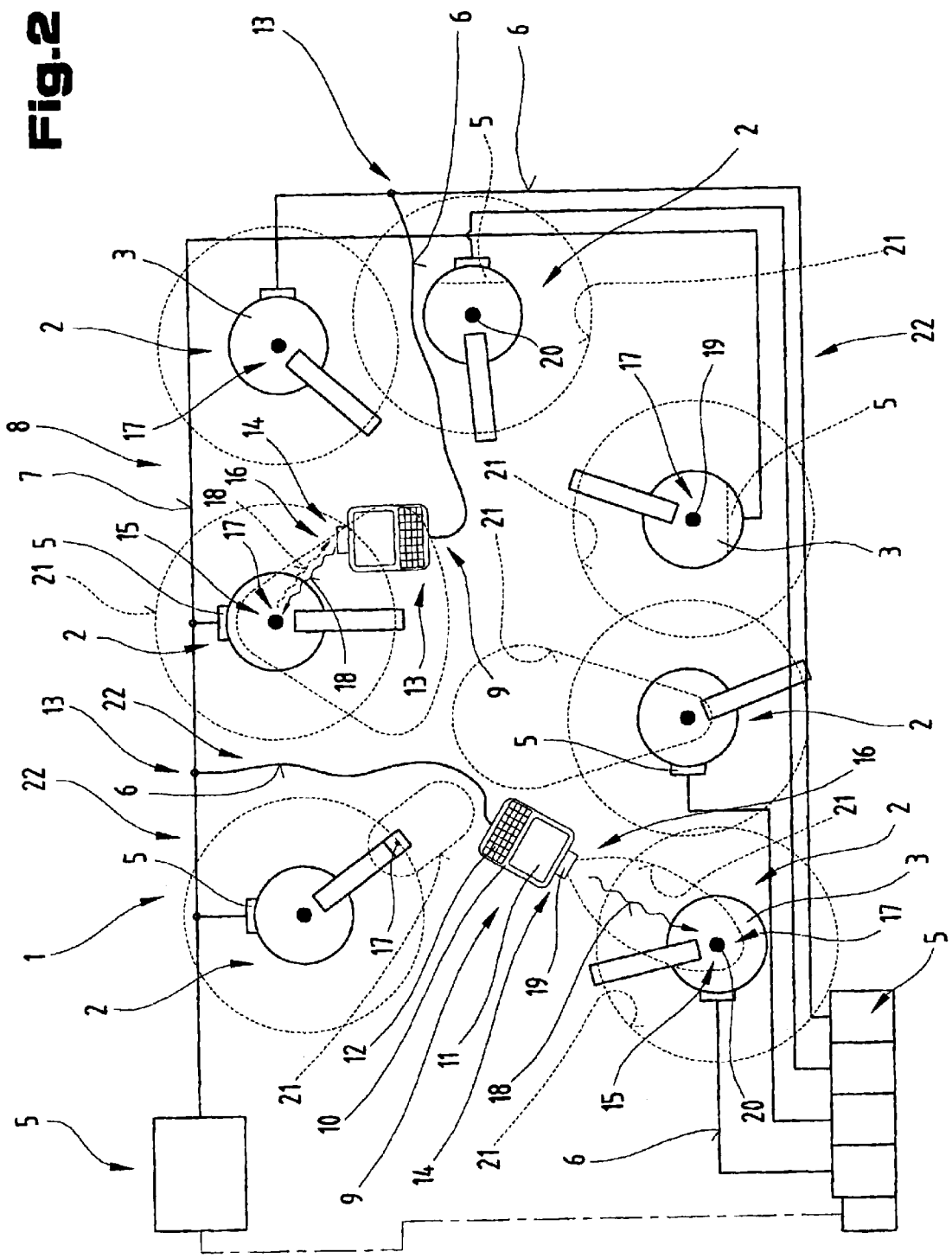

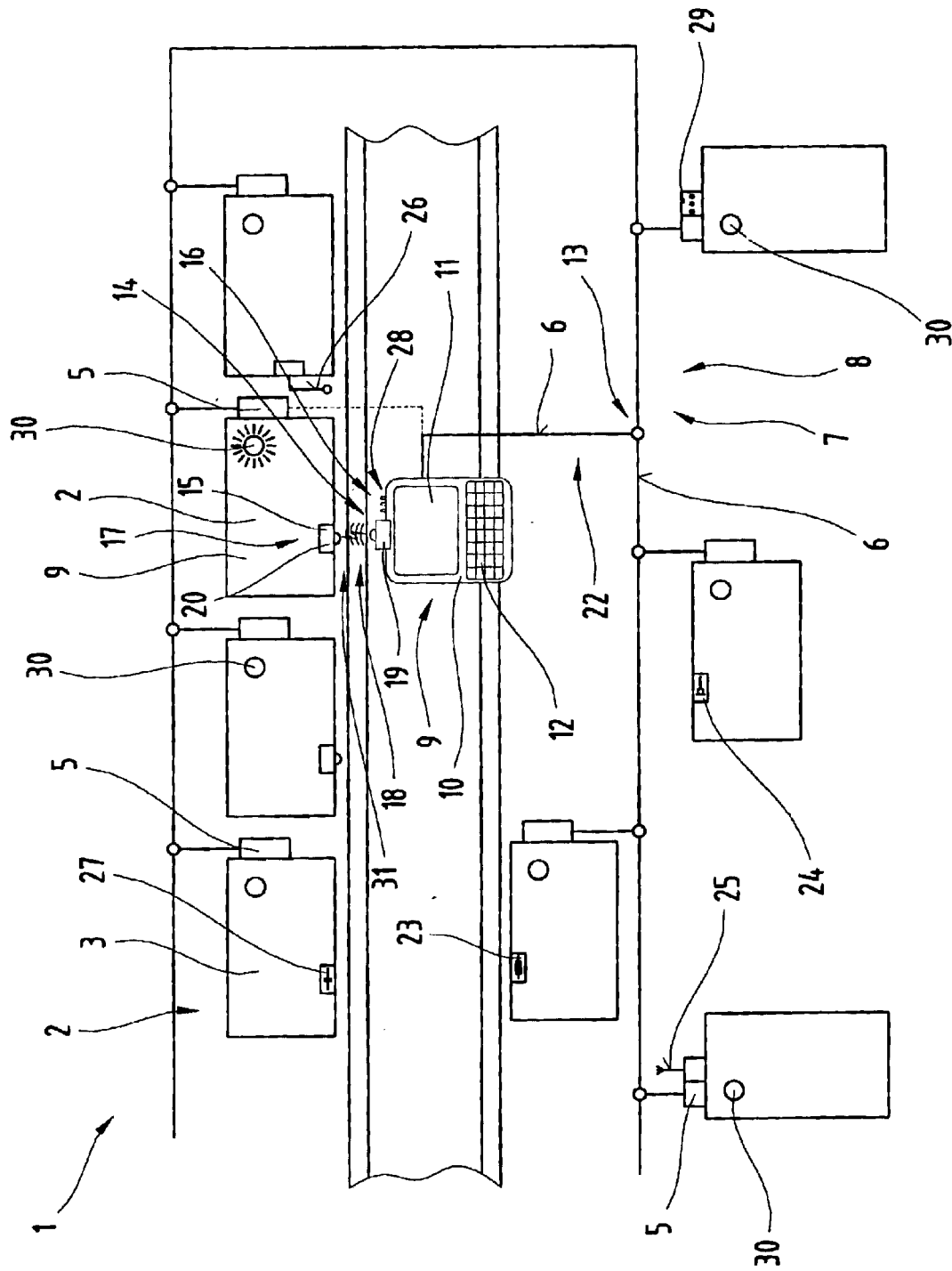

METHOD OF CONNECTING A MOBILE CONTROL AND/OR MONITORING UNIT TO A MACHINE AND A CONTROL AND/OR MONITORING UNIT FOR SAME

BACKGROUND OF THE INVENTION

1. Field of the Invention

The invention relates to a method of connecting a mobile, electronic control and/or monitoring unit to at least one machine or at least one machine component in a group or a plurality of machines or machine components to be monitored and/or controlled, for example industrial robots or manipulators, and an appropriate control and/or monitoring unit for this purpose, having an input device with several control elements and/or an optical display and having at least one interface co-operating with at least one control device for one or more machines or machine components, for example robots.

2. The Prior Art

An automation system with individual production cells consists of several machines or industrial robots programmed by an operator, and these have to equipped accordingly and optionally checked and monitored in order to set up a correct production sequence and obtain consistently high product quality. Mobile or portable electronic control units are used for this purpose, which more often than not enable the technical process to be displayed. The respective machines are usually arranged very close to one another and, because they are generally assigned to different processing tasks, these machines therefore have different control programmes for operating the requisite motion or processing sequence. A mobile control and/or monitoring unit must be designed for use with as many machines as possible in order to keep the number of control and/or monitoring units needed, and hence the costs of the technical plant, to a minimum. In order to be able to connect the control and/or monitoring unit to a specific machine, the operator generally has to enter identification numbers or codes from the hand terminal or select these from a list of codes. This is usually assisted by lists of references or plans relating to the installation and types of machines and this documentation has to be kept constantly up to date in order or prevent error sources.

SUMMARY OF THE INVENTION

The underlying objective of the present invention is to provide a connection method without increasing the complexity inherent in the requisite operation. Another objective of the invention is to provide a control and/or monitoring unit that is suitable for this purpose.

The objective is achieved by the invention due to the fact that in a connection or log-on procedure between the control and/or monitoring unit and the respective machine or a distant point on the machine, a clear connection or log-on link is set up by means of interfaces to the selected, wireless direction-finder of the corresponding distant point or by means of transmitters and/or receivers tuned to the transmission range or reception range, with a limited, localised functional or operating range and, once the connection has been acknowledged and established, the pre-programmed control and/or monitoring of the machine or the machine component is managed via another, standard data transmission means, for example a hard-wired network and/or via a wireless link between the control and/or monitoring unit and the selected machine or selected machine component. The advantage of this arrangement is that control and/or monitoring unit or the hand terminal used to control and/or observe an application can be operated in a manner that is totally logical and transparent to the operator. Furthermore, the connection as proposed by the invention is performed with the least possible risk of error and the connection sequence is clearly visible to the operator during the process. Another significant advantage of the features proposed by the invention resides in the fact that the log-on or connection procedure can be performed in a much shorter time so that the actual control or monitoring process can be performed sooner. Moreover, there is no longer any need to update or maintain documentation or plans, thereby ruling out another source of errors due to obsolete data, documentation or plans during control or monitoring. Consequently, the solution proposed by the invention enables a control and/or monitoring unit or a hand terminal to be logged on in a perfectly orderly and rapid manner to the applications which need to be controlled and/or monitored. In addition, there is barely any possibility of incorrect operation such as occurs when a number or an address has to be entered from a manual terminal. The method proposed by the invention therefore protects the machinery or the product to be manufactured and personnel from significant damage or injury. As a result of the directed or restricted geographical functional or operating range of the communication or transmission channel, the log-on or connection is very selective and incorrect connections can be virtually ruled out. The log-on or connection procedure is absolutely clear and logically transparent to the user. Another advantage is that the interfaces or the transmitters and/or receivers used to set up the transmission or communication channel may have a small bandwidth and are therefore relatively inexpensive to set up. The actual control and/or display data is in effect exchanged via the tried and tested, functionally safe data transmission means operated in an automation system of this type anyway.

A clear signal is indicated at least on the respective machine and/or on the control and/or monitoring unit when a link or connection has been established, which is an advantage because the user can be alerted to the fact that an operational connection has been established with the respective machine by acoustic and/or optical means.

Another advantage is that an active connection or log-on of a control and/or monitoring unit to one or more machines or machine components can not be terminated except by a deliberate or conscious log-off by the user, who must operate at least one control element of an input device of the control and/or monitoring unit or a control device of the machine or the machine component, which prevents the control and/or monitoring unit from being undesirably connected again or logged on again to another machine, thereby ruling out incorrect control procedures or erroneous monitoring procedures.

Because the link or log-on connection is cyclically checked against a valid log-on process and the control and/or monitoring unit is terminated either automatically or by the user, who simply quits by selecting the log-off option if the selected link or log-on connection goes down or is interrupted, a procedure to log off the control and/or monitoring unit can be operated extremely quickly and particularly easily.

During the procedure of logging on the control and/or monitoring unit, an identification number or code is transmitted and an acknowledgement returned, via the standard data transmission means or via the same wireless transmission channel, by the distant point or machine receiving this code, which also checks to ensure that the control and/or monitoring unit transmitting the code is valid, so that a specific machine or a specific machine component can not log on inadvertently or undesirably, nor can a specific machine or a specific machine component be controlled more than once.

The connection between the control and/or monitoring unit and the respective machine to be controlled and/or observed is effected automatically on entering the functional or operating range of the transmitter and/or receiver or simply by actively accepting/acknowledging the potential connection, which firstly makes for very easy operation and secondly means that a link or connection can only be made consciously by the user, thereby preventing undesirable connections.

Since the user can access the control and/or monitoring unit directly, a connection can be activated instantaneously and easily without the user having to switch locations.

The fact that the functional and operating range of the transmitters and/or receivers lies within the close immediate vicinity around the machines and/or around the control and/or monitoring unit means, firstly, that the hand terminal can not be connected to a machine unintentionally. Secondly, the hand terminal is prevented from connecting several times to machines located in the vicinity of one another.

Because the wireless connection is a radio link, mobility of the user terminal is virtually unlimited and cabling can be reduced to a minimum or dispensed with altogether.

The objective of the invention is also achieved by a control and/or monitoring unit having an input device with several operating elements and/or an optical display and having at least one interface to at least one control unit for one or more machines or machine components, for example robots. The advantage of this is that the connection or log-on procedure can be undertaken in a very short time and is also very conducive to preventing errors. In addition, the log-on procedure is simple to operate and users require very little in the way of training. The connection or log-on procedure proposed by the invention and operated via the hand terminal is very easy for the user to understand and offers the user a virtually intuitive procedure for selecting a machine or machine components.

The advantage of this arrangement is that the interface comprises a transmitter with a transmission characteristic that is directional or locally limited or restricted to the area in the immediate vicinity, which means that the control and/or monitoring unit can be unequivocally connected to the desired machine by a simple direction-finder of this machine or by simply positioning the control and/or monitoring unit in the immediate vicinity of the respective machine.

Another advantage is that the distant point comprises a receiver responding to the transmitter, which means that a one-way data transmission channel can be established and the number of components needed for the automated log-on or connection procedure can be kept to a minimum.

Another advantage is the fact that the distant point is provided as a receiver with a defined, limited reception sensitivity since this enables a clear and selective connection to be established and the transmitter can be rated to handle a relatively high transmission power or transmission range.

Another possibility is for the interface of the control and/or monitoring unit to have a receiver for signals transmitted in the region of a machine, by means of which the control and/or monitoring unit is allocated to the passive or receiving component and energy consumption of the control and/or monitoring unit and/or receiver can be kept low.

Due to the fact that the connection link-up between the transmitter and the receiver is uni-directional, an inexpensive system can beset up requiring few electronic or electro-mechanical components.

The interface is provided as an optical transmitter for infrared signals or laser light which means that a simple system can be set up for a directional transmission path between two units located at a distance apart from one another.

The interface is provided as a transmitter for electromagnetic waves, which enables a failsafe and transparent connection to be made across longer distances.

The transmitter and receiver co-operating with one another are provided as a transponder system, which offers an advantage in that the log-on procedure or the connection procedure can be carried out within an area of close proximity at a generally standard distance of between a few centimeters and about one meter. Of particular advantage is the fact that a transponder system of this type can be set up as a transmitter and/or receiver operating without batteries, so that the corresponding transponder can be connected to the hand terminal or the respective machine in a simple manner. This therefore obviates the need for complicated cabling or integration of the transponder in the electronic system of the control and/or monitoring unit or in the control device of the machine. A reading device for the transponder merely has to be provided, either on the machine to be controlled and/or monitored or on the hand terminal, which means only having to access a part region of the electronic control system. Furthermore, the transponder system can be used to set up a simple coding system for the connection procedure, in order to avoid or prevent multiple connections.

Advantage is to be had from a communication connection in which the interface is provided as an acoustic transmitter, for ultrasonic signals for example, since collisions or cross-connections with the existing infrared or radio links can be ruled out.

Another advantage is the fact that the interface is provided either in the form of contact pins and/or a contact rod or by means of an electrical contact surface with a complementary counter-contact on the machine to be controlled and/or monitored, because this means that the control and/or monitoring unit can be directly placed in contact with the corresponding distant point on the machine, at least for a brief period, thereby ruling out any incorrect connections.

Also of advantage is the fact that an operating element of the input device is provided for selectively logging on and terminating the connection, which means that a potential connection of the control and/or monitoring unit to a machine, automatically detected by the control system, is consciously initiated by the user, preventing undesirable communication links from being established. Alternatively or in combination with this feature, conditions or signals, which may, as an option, be automatically detected by the control system, to indicate that the communication link is to be effectively terminated or cut off, are actively cancelled by the user so that existing data or link connections can not be undesirably terminated.

Due to the fact that a distance-measuring device and/or a position sensor is provided as a means of detecting the distance of the control and/or monitoring unit relative to a machine or a machine component, a system can be set up by means of which connection and/or log-off conditions can be detected or monitored to a high degree of safety in terms of the pre-set direction or routing and/or as regards the pre-defined geographical vicinity of communication devices.

Finally, another advantage is gained by the fact that the interface is provided as a transmitter and/or receiver for signals to and/or from a distant point or transmitter and/or receiver co-operating therewith, disposed in the vicinity of the machines to be controlled and/or monitored since a two-way and/or a one-way communication route can be optionally set up. Particularly if using two-way communication, it is of advantage that a potential connection can be counter-checked, for example by exchanging and evaluating codes or addresses. This arrangement also allows status information to be exchanged, thereby offering highly reliable connection links using the so-called "hand-shake" procedure. Furthermore, this will enable unintentional disconnections by parties to the link to be evaluated to enable defined or critical disconnections to be made.

BRIEF DESCRIPTION OF THE DRAWINGS

The invention will now be described in more detail with reference to embodiments illustrated in the drawings, wherein:

FIG. 2 shows another embodiment of a production cell having, for example, two mobile control and/or monitoring units or hand terminals, each of which is moved around to connect and operate the machines or a manipulator of the production cell;

FIG. 3 is a very simplified, schematic diagram of another embodiment of an automated system having several machines or robots standing close to one another and a co-operating hand terminal.

DETAILED DESCRIPTION OF PREFERRED EMBODIMENTS

Figure 1:
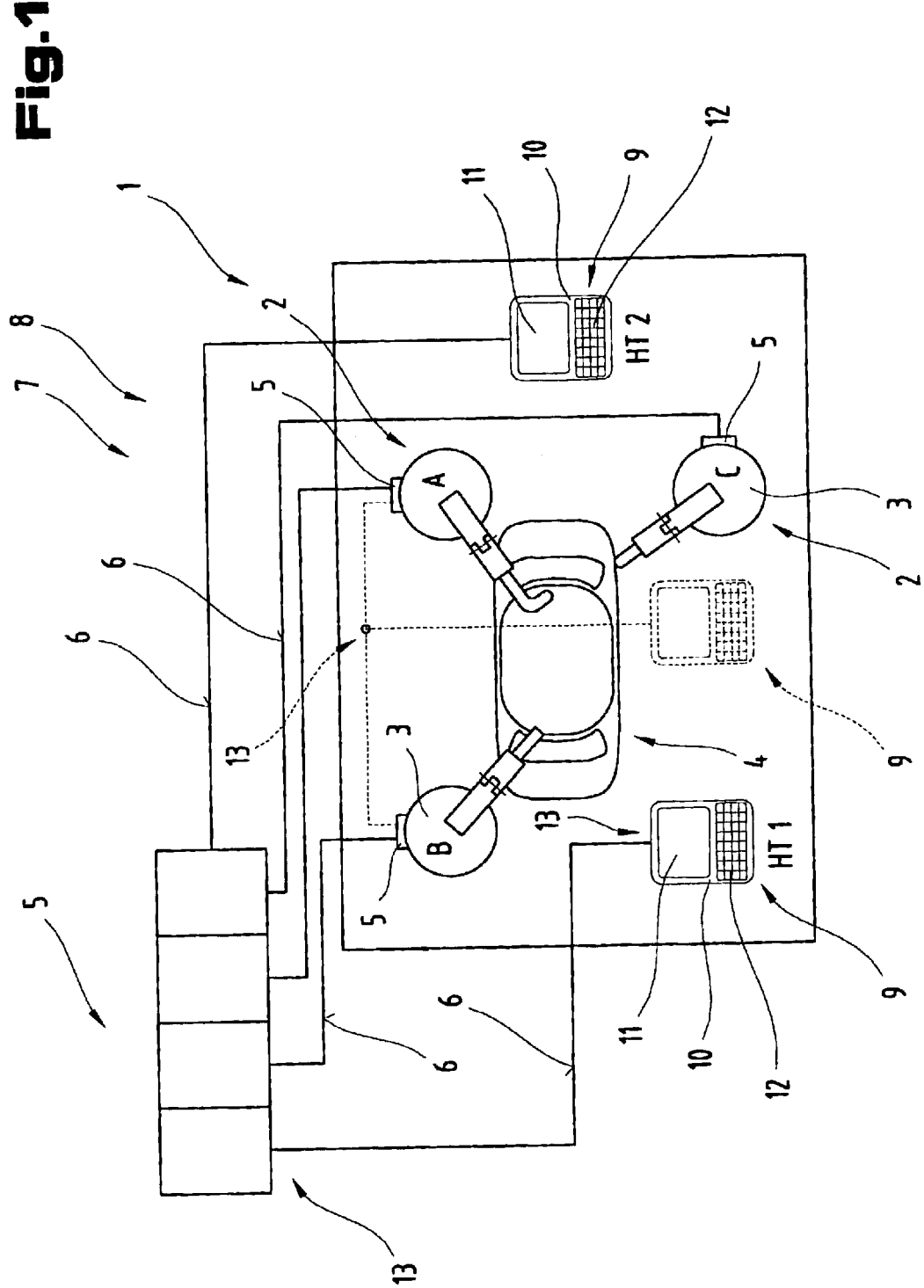
FIG. 1 is a very simplified, schematic diagram of one embodiment of a production cell of an automation system having several manipulators and the respectively connected control units.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a production cell of an industrial automation system 1. The automation system 1 may consist of a group of production cells of this type or different types. A production cell comprises at least one machine 2, for example a robot 3, or other machine components for automating technical processes.

A machine 2 may therefore consist of several machine components and the individual machine components act in the desired manner on a product 4 to be manufactured or processed.

In the embodiment illustrated as an example here, three robots 3 or three independent manipulators are processing a motor vehicle for assembly, for example. The robots 3 may be welding robots or manipulators, used to assemble or process components.

In terms of general standard structure, each machine 2 or each robot 3 has a control unit 5 or may alternatively or additionally be provided with a central control unit 5 connected to the respective machines 2 or robots 3. The control unit 5 is connected by leads to the actuators and/or sensors or transmitters of the machine 2 and can therefore be provided with control and/or regulator circuits, for example for drives and other components of the respective machine 2.

Control units 5 provided externally to the machine 2 are generally connected to the respective machine 2 by means of electrical and/or optical leads 6. By preference, in order to minimise cabling requirements between the control units 5 and the machines 2, a bus system 7 or a network 8 is set up to exchange information or data as required between the control units 5 and the respective machines 2. This bus system 7 may be set up using any networking systems known from the prior art, preferably using standardised field bus systems.

Instead of using a hard-wired network 8, it would of course also be possible to use a wireless communication link, for example a radio link, between all or individual components or the automation system 1.

In order to control and/or monitor the individual machines, which are usually arranged close to one another, at least one control and/or monitoring unit 9 is provided. These units 9 for controlling and/or monitoring the technical application or the machines 2 are mobile at least within the production cell or within the automation system 1. This being the case, the control and/or monitoring unit 9 may be a console-type device with its own carrying system or may be provided with a stand pedestal. By preference, the control and/or monitoring unit 9 is designed so that it can be carried effortlessly by a user and positioned at any point within the automation system 1. Accordingly, the control and/or monitoring unit 9 is provided as what is referred to as a hand terminal 10, which can be placed on the hand surface or lower arm of the user.

In order to monitor and optionally facilitate operation of the machine 2, the control and/or monitoring unit 9 has a display 11. This optical display 11 may be an LCD display or as flat as possible a screen capable of handling graphics. The plan of the plant, process data, operating instructions, control features and similar may be displayed on this display 11.

In order to operate a machine 2, the control and/or monitoring unit 9 has at least one input device 12, for example in the form of keys, switches, dials, pointing devices, control levers and similar. Optionally, the display 11 and the input device 12 may also be combined and provided in the form of a touch-sensitive screen or touch-screen. Similarly, individual displays 11, for example control lamps in input devices 12 or keys, may be integrated in order to provide optical signalling of the respective connection status.

A cable connection is usually provided so that information or data can be exchanged between the control and/or monitoring unit 9 and the control unit 5. Clearly, it would also be possible to use wireless communication systems for transmitting information between the control unit 5 and the control and/or monitoring unit 9, offering a high degree of mobility due to the fact that no wiring is required for the control and/or monitoring unit 9. Particularly if using a wireless link, at least one socket connector 13 is provided on the control unit 5 and/or in the network 8. The control and/or monitoring unit 9 can then be connected into the control system by means of this socket connector 13. Accordingly, these socket connectors 13 may be provided on the centrally disposed control unit 5, for example on a control cabinet, or by means of network sockets between the individual units. The hand terminal 10 can then be plugged into the socket connector 13 at any point within the automation system 1 and operated in a network with the respective machine 2.

Individual machines 2 or individual machine components in the group of machines 2 arranged one adjacent to the other can be operated and or monitored and controlled in terms of their functional and or operating mode by means of the control and/or monitoring unit 9. Amongst other things, the control and/or monitoring unit 9 may be used to programme processing or motion sequences for the machine 2 or robot 3. To this end, the user may pre-set motion sequences using the input device 12 of the hand terminal 10, which are stored in a memory of the control unit 5. This procedure, also referred to as "teach-in modus" demands the utmost accuracy on the part of the user and any erroneous or incorrect operations could cause considerable damage to the machine 2 or product 4. Once the "teach-in" process for the machine 2 has been completed, the corresponding stored control programme can be retrieved as many times as required, as a result of which the process procedure can be run automatically.

The control and/or monitoring unit 9 may also be plugged into the control system for control and test purposes or for diagnostic functions and the correct sequence of the automation system or machine 2 tested. Erroneous or faulty monitoring of the system can also have serious consequences. This is particularly the case if the operator inadvertently accesses the control unit 5 and alters its sequence.

Above all, the variable position of the user of the control and/or monitoring unit 9 constitutes a certain source of error. However, virtually unrestricted mobility of the user is of absolute necessity if he is to be able to monitor or observe the machines 2 as efficiently as possible. However, it is no longer possible to detect clearly a connection between the hand terminal 10 acting as a control or monitoring unit and the machine 2 actively connected to this hand terminal 10.

Due to the complex and often non-transparent cabling of the individual machines 2 within an automation system 1 or production cell having many autonomous machines 2 arranged close together, it is difficult for the operator to retain an overall view and set up communication connections correctly. In particular because of the nature of the environment, the nature of the application and the variable position of the user relative to a machine 2 to be operated and/or monitored, problems can arise when it comes to operating and/or monitoring machines or system components using the portable hand terminal 10. Particularly in complex production cells in which a lot of autonomous machine units are arranged close to one another and have a complex cabling system that is difficult to oversee or a cable-free connection or a network connection, difficulties in connecting the hand terminal 10 to the respective machine 2 can not be ruled out. This is particularly so because no clearly detectable connection can be established between the control and/or monitoring unit 9 and the application to be controlled and/or monitored. There is therefore a risk of faulty operation and hence of accidents causing material damage and endangering the lives and health of personnel in the area around the machines 2.

FIG. 2 is another schematic diagram showing a plurality of machines 2 or robots 3. Some of the individual machines 2 are connected to one another via a bus system 7 or the network 8 and linked to a centrally disposed control unit 5. Similarly, some of the individual machines 2 are linked by hard-wired cable connections to respective co-operating, externally disposed control units 5. As indicated by broken lines, a communication link can also be set up between individual control units 5 disposed at a distance apart from one another.

An appropriate control and/or monitoring unit 9 can be connected into the network 8 at any point deemed most suitable for control and/or monitoring purposes, as schematically indicated by nodal points. To this end, a lead 6 offering maximum flexibility can be provided between the hand terminal 10 and the cabled network system of the machines 2 or to the direct leads 6.

Individual machines 2 within the group of machines 2 can be controlled or monitored by means of the control and/or monitoring unit 9. As is clearly illustrated in FIG. 2, it is not possible to tell which machine 2 is being addressed merely by connecting the control and/or monitoring unit 9 to the network 8 or the cabling system of the control unit 5, given that the control and/or monitoring unit 9 can be plugged into the control system from any of the points within the cable system.

In order to provide a reliable connection of the mobile or portable electronic control and/or monitoring unit 9 to at least one machine 2 or at least one machine component of the plurality of machines 2 or machine components which can be controlled and/or monitored, a connection or logon procedure is provided. A connection is set up by means of corresponding interfaces 14, 15 between the control and/or monitoring unit 9 and the respective machine 2 as part of this connection or logon procedure.

These interfaces 14, 15 may be provided in the form of interfaces for a wireless connection system with a directional characteristic tuned to the direction-finder of the corresponding interface 14 or 15 or the corresponding distant point. Alternatively, instead of having a direction-based communication capability, the co-operating interfaces 14, 15 may be set up to operate within a limited range or with a defined reception sensitivity.

The interfaces 14, 15 comprise co-operating transmitters and/or receivers 16, 17 between which a preferably wireless data channel can be set up.

In order to set up a two-way transmission channel 18, each of the interfaces 14 and 15 has a transmitter 19 and a receiver 20. For practical purposes, however, one of the interfaces 14, 15 is provided as a transmitter and the other co-operating interface 14 or 15 is provided as a receiver 20 so as to be able to set up at least a one-way transmission channel 18 between the two interfaces 14, 15.

The essential factor is that the transmitter 19 has either a clear, directional transmission characteristic so that it can tune in to a corresponding distant point or receiver 20 or a clear transmission range which is as sharply defined as possible. Alternatively or in combination, the receiver 20 may have a clear reception range, which is also as sharply defined as possible, or may be set up to receive only signals from a specific pre-defined direction.

The transmission and reception characteristic of the transmitter 19 or the receiver 20 will be of the standard beam arrangement. Depending on the transmission methods used, the transmitters 19 will have antennas, electric/optical or electric/acoustic signal converters or similar. Similarly, the receivers 20 co-operating with them will have receiving antennas, optical/electric or acoustic/electric converters or similar.

By means of the transmitters and/or receivers 16, 17, which are as far as possible directional or whose transmission range or reception range is limited, a clear connection can advantageously be set up between the control and/or monitoring unit 9 and the respective machine 2. The transmitters and/or receivers 16, 17 may either be set up so as to operate permanently or alternatively may be selectively activated by the user as required. Due to the directional or locally restricted communication capability of the interfaces 14, 15 or the transmitter 19 and receiver 20 co-operating with one another, the control and/or monitoring unit 9 is guaranteed to connect with a quite specifically selected machine 2 only and erroneous faulty connections can be virtually ruled out.

This being the case, it is totally irrelevant whether the transmitter 19 cooperates with the control and/or monitoring unit 9 or the machine 2 to be controlled and/or monitored. By preference, however, the transmitter 19 is set up to operate as an active element of the control and/or monitoring unit 9 and the receiver 20 responding to it is positioned in the region of the machine 2 to be controlled or the machine component to be controlled and/or monitored.

As may be seen most clearly from FIG. 2, a functional and operating range 21 of the transmitters and/or receivers 16, 17 may be circular as seen in plan view or spherical if viewed three-dimensionally. Clearly, as shown by the broken lines, it would also be possible to set up the functional and operating range 21 to be beam-shaped, trapezoidal, kidney-shaped or similar, relative to a horizontal plane. The transmitter 19 could also have a different type of functional and operating range 21 with regard to the receiver 20. By preference, however, the receiver 20 will have an approximately circular functional and operating range 21, whilst the functional and operating range 21 of the transmitter 19, by contrast, is beam-shaped or elongate.

If a desired connection or link structure between the interfaces 14 and 15 of the control and/or monitoring unit 9 and the respective machine or a group of machines 2 is detected, the desired operation and/or monitoring of the machine 2 or the machine component is preferably managed by means of another data transmission means 22 provided as standard, for example via a fixed network, in particular via the network 8, and/or via a wireless link, in particular via a radio link between the control and/or monitoring unit 9 and the selected machine 2 or the selected machine components. The data transmission means 22 provided as standard is the network 8 used as standard and described above or the general standard cable connection between the respective control unit 5 and the machine 2.

FIG. 3 also illustrates a group of several machines 2 or several machine components, whose function or operating mode can be tested by means of an appropriate control and/or monitoring unit 9. The machines 2 or robots 3 of a production line 23 are again networked with one another or are connected by a wireless link, preferably a radio link, to individual machines 2. In this case, every machine 2 is assigned a separate control unit 5, for example a programmable logic controller (PLC), and the individual control units 5 are hard-wired to one another by means of a standard field bus system, for example.

The control and/or monitoring unit 9 can also be connected into this network 8 for the control units 5 or for the programmable logic controllers of the machines 2. This is usually done by means of a lead 6 on the hand terminal 10. This being the case, the control and/or monitoring unit 9 does not need to be connected to the network in the vicinity of the machine 2 to be controlled and/or monitored and the hand terminal 10 can be connected to any point within the network system. However, if the control and/or monitoring unit 9 is connected directly to the respective machine 2, there may be a risk that incorrect connections will be made due to lack of attention, which would then lead to incorrect control or monitoring sequences.

The risk of connecting the control and/or monitoring unit 9 incorrectly is reduced to a minimum by the design of the communication link proposed by the invention or by using the connection procedure proposed by the invention.

In the embodiment illustrated as an example here, the hand terminal 10 has an optical transmitter 19, for example for infrared signals or other optical signals. An appropriate optical receiver 20 is disposed on the machine 2 for receiving the transmitted optical signals, which may therefore be provided in the form of infrared sensors, infrared diodes, laser diodes or any other appropriate optical sensors. A defined transmission channel 18 can be set up between the optical transmitter 19 and the optical receiver 20, by means of which the control unit 5 or the control electronics of the control and/or monitoring unit 9 will clearly detect a logon procedure or a connection process. Consequently, the control and/or monitoring unit 9 is transparently connected to the respective machine 2. The actual exchange of data needed to control and/or monitor the machine 2 is transmitted via the other data transmission means 22, for example via the lead 6 and the network 8.

Optionally, it would also be possible to route some of the data needed to control and monitor the machine via the transmission channel 18 between the two interfaces 14 and 15, which thereby reduces traffic on the network 8. Instead of the optical transmitters and/or receivers 16, 17, it would, of course, also be possible to set up the connection or linking system using capacitive, inductive, electromagnetic or acoustic transmitters and/or receivers 16. This being the case, either read coils 23, electric/acoustic or acoustic/electric converters 24, transmitting antennas 25 and or receiving antennas 26 for electromagnetic waves and/or capacitance sensors 27 are provided. All of the above-mentioned detection or transmission means are permanently mounted on the respective machine 2 on the one hand, for example on a manipulator arm of the robot 3, and on the control and/or monitoring unit 9 on the other hand.

Alternatively, it would also be conceivable for the two interfaces 14, 15 cooperating with one another to be set up using contact pins 28 and/or by means of a contact rod or by means of at least one contact surface to a corresponding counter-contact on the machine 2 to be controlled and/or monitored. In this case, the operator of the control and/or monitoring unit 9 must use the hand terminal 10 to place the counter contacts 29 in contact with the desired machine 2 in order to establish the operating connection.

Once a connection or link has been set up, this is signalled at least on the respective machine 2 but also on the control and/or monitoring unit 9 by means of an appropriate signal transmitter, for example by means of an indicator lamp 30. It would also be possible to use acoustic and/or graphic indicator means, such as symbols or signs, activated on the machine and the respective control and/or monitoring unit. In particular, the signs or symbols on the machine may also be provided in the form of clear identification tables, stickers or similar. In order to distinguish clearly which control and/or monitoring unit 9 is connected to which machine 2 or which group of machines, the signal transmitter may use different types of signals. The individual signals may therefore vary in terms of intensity and/or frequency and/or indicator colour. Above all if using a control and/or monitoring unit 9 with a display 11 having graphics capability, a diagram of the plant can also be displayed and the respective machine 2 actively connected can be highlighted on the display 11.

For practical purposes, the connection or logon link between the control and/or monitoring unit 9 and the respective machine 2 is cyclically checked and if the routed connection or logon link is interrupted or broken off, the control and/or monitoring connection via the data transmission means 22 is terminated or interrupted.

For practical purposes, a clock or timer is operated in the control system or in the control and/or monitoring unit 9, so that a time limit can be defined within which an active connection is maintained, even if no control and/or monitoring activities are pending. If this time limit is exceeded, for example because the user has left the hall or because he has forgotten to actively log off, the data connection to the machine 2 will be automatically cut off and will have to be set up again if necessary.

In one advantageous embodiment, a code or identification number 31 can be transmitted from the control and/or monitoring unit 9 during the logon process and sent back via the standard data transmission means 22 by the distant point or interface 15 receiving this identification number or code and by which the code 31 previously sent for the control and/or monitoring unit 9 will be checked for validity. Clearly, it would also be possible for the unique, non-changeable code to be sent from the interface 15 to the machine 2 and received on the hand terminal 10 from the interface 14.

The connection between the control and/or monitoring unit 9 and the respective machine to be controlled and/or monitored can be established automatically on entering the functional or operating range of the transmitters and/or receivers 16, 17. Alternatively, a simple acknowledgement procedure may be used to confirm the potential connection. The acknowledgement procedure is preferably handled by means of an operating element on the control and/or monitoring unit 9.

The functional or operating range of the transmitters and/or receivers 16, 17 lies in a close vicinity around the machines 2 and/or around the control and/or monitoring unit 9.

For the sake of good order, it should finally be pointed out that in order to provide a clearer understanding of the connection procedure proposed by the invention, its features are explained in general terms and the constituent parts of the control and/or monitoring unit 9 have been illustrated out of scale to a certain extent and/or on an enlarged and/or reduced scale.

The tasks underlying the independent inventive solutions can be found in the description.

Above all, subject matter relating to the individual embodiments illustrated in FIGS. 1; 2; 3 can be construed as independent solutions proposed by the invention. The tasks and solutions can be found in the detailed descriptions relating to these drawings.

What is claimed is:

1. A method of selectively connecting a portable electronic control and/or monitoring unit movable by a user to at least one machine or machine component selectable by the user from a plurality of machines or machine components for control and/or, monitoring by the user, wherein a clear link or log-on connection between the control and/or monitoring unit and a point on the selected machine or machine component is set up by means of interfaces for a selected wireless direction-finder of the point or by means of transmitters and/or receivers tuned to the transmission range or reception range, having a limited, localised operating range and, once the connection has been acknowledged and established, a planned control and/or monitoring of the selected machine or the machine component is managed via another, standard data transmission means, the connection being managed by the user by actively accepting/acknowledging the potential connection by means of an operating element on the control and/or monitoring unit.

2. Method as claimed in claim 1, characterized in that clear signaling at least on the respective machine and/or on the control and/or monitoring unit indicates when a link or connection has been established.

3. Method as claimed in claim 1, characterized in that an active connection or log-on of a control and/or monitoring unit to one or more machines or machine components takes place upon log-on by the user, who must operate at least one control element of an input device of the control and/or monitoring unit or a control device of the machine or the machine component.

4. Method as claimed in claim 1, characterized in that the link or log-on connection is cyclically checked against a valid log-on process and control and/or monitoring of the machine is terminated either automatically or by the user, by selecting a log-off option, if the selected link or log-on connection goes down or is interrupted.

5. Method as claimed in claim 1, characterized in that, during the log-on procedure of the control and/or monitoring unit, an identification number or code is transmitted and acknowledgment is returned, via the standard data transmission means, by the distant point or machine receiving this code, which also checks to ensure that the control and/or monitoring unit transmitting the code is valid.

6. Method as claimed in claim 1, characterised in that the functional and operating range of the transmitters and/or receivers lies within a close immediate vicinity around the machines and/or around the control and/or monitoring unit.

7. Method as claimed in claim 1, characterised in that the standard transmission means is a hard-wired network.

8. Method as claimed in claim 1, characterised in that the standard transmission means is a wireless link between the control and/or monitoring unit and the selected machine or machine component.

9. A portable electronic control and/or monitoring unit movable by a user, comprising an input device with several operating elements and having at least one first interface to at least one control unit for one or more machines or machine components, second interface for a wireless connection system to a co-operating point in or on the machine or machine component to be controlled and/or monitored for enabling the user to establish a clear connection or link between the control and/or monitoring unit and the one or more machines or machine components selected by the user from a plurality of machines or machine components to be controlled and/or monitored, and an operating element on the input device for enabling the user to selectively establish and/or terminate an operative connection via the at least one first interface.

10. Control and/or monitoring unit as claimed in claim 9, characterized in that the interface has a transmitter with a directional transmission characteristic.

11. Control and/or monitoring unit as claimed in claim 9, characterised in that the interface has a transmitter with a locally restricted transmission characteristic or a transmission characteristic that is restricted to the area in the immediate vicinity.

12. Control and/or monitoring unit as claimed in claim 9, characterised in that the distant point comprises a receiver responding to the transmitter.

13. Control and/or monitoring unit as claimed in claim 9, characterised in that the distant point comprises a receiver with a defined, limited reception sensitivity.

14. Control and/or monitoring unit as claimed in claim 9, characterised in that the interface of the control and/or monitoring unit comprises a receiver for signals transmitted by the transmitter in the vicinity of a machine.

15. Control and/or monitoring unit as claimed in claim 9, characterised in that the connection link between the transmitter and the receiving is one-way.

16. Control and/or monitoring unit as claimed in claim 9, characterised in that the interface is provided as an optical transmitter for infrared signals or laser light.

17. Control and/or monitoring unit as claimed in claim 9, characterised in that the interface is provided as a transmitter for electromagnetic waves.

18. Control and/or monitoring unit as claimed in claim 9, characterised in that the co-operating transmitter and receiver are provided as a transponder system.

19. Control and/or monitoring unit as claimed in claim 9, characterised in that the interface is provided as an acoustic transmitter, for example for ultrasonic signals.

20. Control and/or monitoring unit as claimed in claim 9, characterised in that the interface is provided with in the form of contact pins and/or a contact rod or by means of an electrical contact surface with a complementary counter-contract on the machine to be controlled and/or monitored.

21. Control and/or monitoring unit as claimed in claim 9, characterised in that a distance-measuring device and/or by a position sensor is provided for detecting the distance of the control and/or monitoring unit relative to a machine or a machine component.

22. Control and/or monitoring unit as claimed in claim 9, characterised in that the interface is provided as a transmitter and/or receiver for signals to and/or from a co-operating distant point or transmitter and/or receiver, which is disposed in the immediate vicinity of the machines to be controlled and/or monitored.

* * * * *